Figure 1:
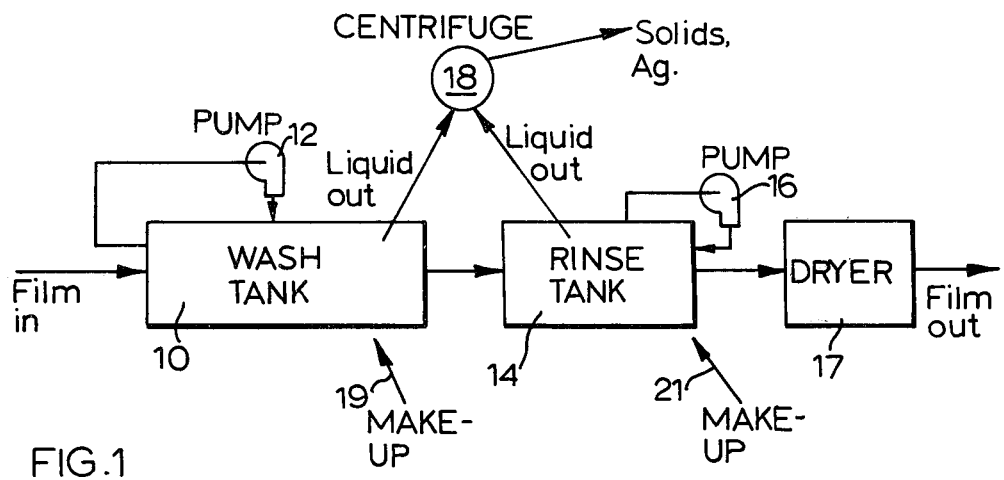

United States Patent [19]

Phillips

[11] 4,150,977

[45] Apr. 24, 1979

[54] PROCESS FOR STRIPPING PHOTOGRAPHIC MATERIALS

[75] Inventor: Patrick A. Phillips, Weston, Canada

[73] Assignee: Keltek Processing, Inc., Boston, Mass.

[21] Appl. No.: 846,189

[22] Filed: Oct. 27, 1977

[51] Int. Cl.² ............................................. C22B 11/04
[52] U.S. Cl. ............................... 75/118 P; 75/101 R; 75/83; 96/50 R; 423/27; 423/43
[58] Field of Search ............ 75/118 R, 118 P, 101 R, 75/83; 423/27, 43; 96/50 R

[56] References Cited

U.S. PATENT DOCUMENTS

| 3,647,422 | 3/1972 | Wainer | 75/101 R |
| 3,748,123 | 7/1973 | Bakker | 423/43 X |
| 3,873,314 | 3/1975 | Woo et al. | 96/50 R |
| 4,078,916 | 3/1978 | Gerber et al. | 75/118 P X |

FOREIGN PATENT DOCUMENTS 331006  6/1930  United Kingdom .................. 75/118 P

OTHER PUBLICATIONS

Hackh's Chemical Dictionary, McGraw-Hill, Inc., 1969, pp. 302, 303, 391, 486, 487 and 636.

Primary Examiner—G. Ozaki
Attorney, Agent, or Firm—Sim & McBurney

[57] ABSTRACT

This invention provides a method and apparatus for treating photographic film to recover silver and the plastic base layer for re-use. A wash tank containing warm water at about neutral pH contains at least one enzyme from the following group: protease, amylase, lipase. The water in the wash tank is agitated and the enzymes attack the adhesive and organic layers on the plastic base, in order to loosen and remove these materials. The film is then placed in a rinse tank containing either a weak aqueous glycol solution or a weak caustic solution which is agitated. Finally the film is removed from the rinse tank and dried. Liquid is removed from the wash tank and treated to remove silver therefrom.

7 Claims, 2 Drawing Figures

PROCESS FOR STRIPPING PHOTOGRAPHIC MATERIALS

This invention relates generally to a process for stripping used and unused X-ray, industrial and other photographic films and materials, in order to recover silver therefrom, and also to recover the polyester or other plastic base material in a sufficiently clean state that it may be re-cycled for use as new film or other product manufacture.

At the present time, the most common method of recovering silver from used or unused photographic film has been to burn the material and then treat the ash so recovered. The current procedures result in loss of silver, which tends to be carried off in the combustion gases. There are also problems with air pollution.

Various washing methods are also in use at the present time, utilizing caustic, bleaches or various acids as the solvent. These washing methods generally remove only the silver, and leave all or some of the gelatine or protein, and on some varieties of film the sub-layer of adhesive on the plastic base is also left. When any coating or layer remains on the plastic base, the latter cannot be recycled without further extensive treatment.

The waste liquids from these processes also are considered as pollutants, and ordinarily cannot be discharged without further treatment.

In view of the foregoing shortcomings of the current methods of treating photographic materials for re-use, there has been developed a method for stripping such materials which removes all of the silver, protein, gelatine, adhesive and other materials, and is able to leave the plastic base in a form in which it can easily be recycled.

Accordingly, this inventio provides a method of treating photographic film consisting of a plastic base layer, an overlayer of adhesive, and an organic layer containing silver, to recover silver therefrom, comprising the steps:

passing the film into a wash tank containing hot water at a temperature in the range from about 30° C. to about 60° C. and a pH in the range of about 5 to about 9, the water containing at least one enzyme selected from the enzyme families: protease, amylase, lipase;

allowing the film to remain in the wash tank while agitating the water therein, whereby the enzyme or enzymes can attack the adhesive and organic layers and the agitated water can loosen them, removing the film from the wash tank and passing it into a rinse tank containing one of (a) a weak aqueous glycol solution, or (b) a weak caustic solution;

allowing the film to remain in the rinse tank while agitating the liquid therein, whereby remaining adhesive can be attacked by the liquid and the agitation can further remove remaining portions of adhesive and organic material from the plastic base layer, removing the film from the rinse tank and drying it, and removing liquid from the wash tank and passing it through means for abstracting silver therefrom.

Additionally, this invention provides an apparatus for treating photographic film that consists of a plastic base layer, an overlayer of adhesive, and an organic layer containing silver, in order to recover silver therefrom, the apparatus comprising:

a wash tank containing hot water at a temperature in the range from about 30° C. to about 60° C. and a pH in the range of about 5 to about 9, the water containing at least one enzyme selected from the enzyme families: protease, amylase, lipase;

a rinse tank containing one of (a) a weak aqueous glycol solution, or (b) a weak caustic solution;

drying means for drying water from the film;

means for abstracting silver from the liquid in the wash tank; and carrier means for introducing film to be treated sequentially into the wash tank, the rinse tank and the drying means.

Figure 2:
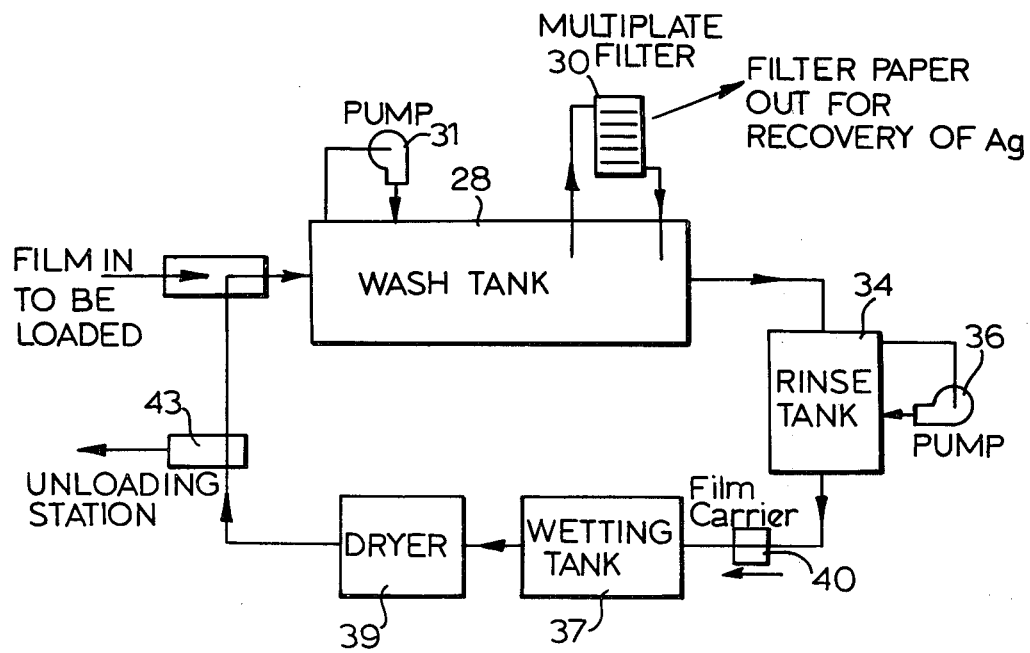

Two embodiments of the process of this invention are illustrated in the accompanying drawing, in which FIG. 1 is a schematic view of the various components in the first embodiment, while FIG. 2 is a schematic view of the components of the second embodiment.

In the drawing, the numeral 10 designates a wash tank which may have a capacity of about 1,000 gallons, and which contains hot water at a temperature between about 30° C. and about 60° C., and an enzyme or combination of enzymes which will be described in greater detail below. A pump 12 is responsible for continuously recirculating and agitating the water in the wash tank. The used or unused photographic film is placed in a basket (not shown) and lowered into the wash tank 10 where it remains for a matter of minutes. The length of time will depend on how much film is placed in the tank at any given time, on the amount of enzyme present, and on the degree of agitation of the water. During the dwell time within the wash tank 10, the enzymes in the hot water contained in the wash tank 10 attack the protein, gelatine and adhesive on the plastic base of the film, and loosen these materials in such a manner that the agitated water within the tank can dislodge them. Naturally, a method of heating the water in the tank 10 and controlling the range of its temperature would also be provided, although this has not been specifically illustrated in the drawing. After the protein, gelatine and adhesive have been loosened from the plastic base of the film, the basket in which the film resides is removed and is immersed in a rinse tank 14 which may contain either a weak aqueous glycol solution (around 10% glycol) or a very weak caustic solution (around 1% caustic). Each of these materials is particularly suited to removing any remaining adhesive. A further pump 16 recirculates the water in the rinse tank 14 in order to allow agitation to remove any bits of the protein, gelatine or adhesive which may have remained on the film base during transport from the wash tank 10 to the rinse tank 14. After the last of these materials has been removed through agitation from the film base, the film is removed and passed through an air dryer 17, from which it emerges in a condition ready to be recycled.

It will be appreciated that the liquid contained in the wash tank 10, in the absence of any other provision, would gradually accumulate more and more of the removed protein, gelatine and adhesive from the film which is being processed. Also, the enzymes would tend to become used up after a period of time. For this reason, provision is made to remove the liquid periodically or at a slow continuous rate to a centrifuge 18 which is able to separate from the liquid the solids and the solid silver in particular which are contained in suspension in the liquid. A make-up provision 19 is also provided in order to maintain the quantity of water and the concentration of enzymes in the wash tank 10.

The rinse tank also will gradually accumulate amounts of protein, gelatine and adhesive which are removed from the film, although at a slower rate than takes place in the wash tank 10. For this reason, provision is made for periodically removing the liquid from the rinse tank and passing it through the centrifuge 18. The same centrifuge can be used for both tanks. Again, any loss of liquid would have to be replenished from time to time, through a make-up provision 21.

It will be understood that the outlets from the two pumps 12 and 16 will be located in the respective tanks in such a manner as to promote most efficiently the removal of the loosened materials from the film base.

In regard to the enzymes used in the wash tank 10, it has been found that the family of enzymes known as protease is able to carry out the necessary function quite satisfactorily, so long as the pH is maintained within the limits 5 to 9, and preferably with the limits of 6.5 to 7.5. It has been found that the closer the solution can be maintained to exactly neutral, the better are the results obtained. For this reason a particularly preferred range for the pH is 6.8 to 7.2.

In addition to the protease family of enzymes, it is considered that the amylase and lipase families would also function satisfactorily. It is considered that these three enzyme families could be employed separately or together in any combination.

In a further embodiment of the invention shown in FIG. 2 of the drawings, there is provided a wash tank 28 identical in all respects with the wash tank 19 of FIG. 1, except that the means for removing silver from the wash tank water includes a multiplate filter 30 of conventional kind, the filter being one in which the wash tank liquid is removed and forced through a plurality of sheets of filter paper. At intervals, the filter paper sheets are removed from the multiplate filter, and in accordance with the process of this invention these sheets are subsequently roasted to burn off gelatine and other non-metallic materials, leaving primarily metallic silver. A minor portion of non-metallics would also remain, such as carbon and some sulphides, depending upon the roasting temperature. A roasting temperature in the region of 1,000° F. to 1,200° F. is considered satisfactory.

It is to be stressed that the multiplate filter takes water from the wash tank 28 and returns cleaned water to the wash tank. The enzymes utilized with this process, which are present in the water of the wash tank 28, tend to be more active in clean water than in water in which materials from the film have accumulated. By continuously or periodically removing the bits of gelatine, protein and adhesive from the water, the enzymes will be left with only the fresh, "unseparated" film to attack, and their action will thus be more efficient. A pump 31 is provided to recirculate water from the wash tank and back to the wash tank, in order to keep the water in a state of agitation, so that the separation of materials from the plastic base layer of the film will be promoted.

Subsequent to the wash tank 28 there is provided a rinse tank 34, which is identical in all respects to the rinse tank 14. The rinse tank 34 can also be provided with a filter similar to the filter 30 on the wash tank if desired, although this has not been illustrated. A pump 36 is again provided to recirculate rinse tank liquid in order to keep it agitated.

Following the rinse tank 34 is a wetting tank 37 which contains water and a wetting agent. The wetting agent is such as to promote "balling up" and drying of water from the plastic film base in a subsequent dryer 39, which can be identical in all respects to the dryer 17 of FIG. 1.

As can be seen in FIG. 2, the various tanks are arranged in a loop circuit, and a film carrier 40 of known kind can be utilized with an appropriate track of conventional nature to carry one or more sheets of film sequentially through tank 28, tank 34, tank 37 and the dryer 39.

After leaving the dryer 39, the film carrier 40 with the film in it arrives at an unloading station 43, where the film can be manually removed from the carrier and placed on a conveyor or in boxes, etc., for subsequent disposition. The film at this state will consist only of the plastic base layer, and the latter will be free of all adhesive, protein or gelatine, as well as the silver which had previously been contained in the organic layer. In this specification and the appended claims the term "organic layer" is intended to be generic to both protein and gelatine.

After leaving the unloading station 43, the carrier 40 advances to a loading station, where the loading can be done manually or automatically. Untreated film is then loaded into the carrier at the loading station, and the carrier takes this untreated film through the tanks and dryer again in the same sequence.

The advantages of the process herein described are several. Firstly, the film base is retained in its original configuration and does not need to be granulated or shredded. This facilitates visual inspection prior to re-use.

Secondly, any liquid discharge from the tanks tends to be in the range stipulated above, which as indicated should be as close to neutral as possible. Thus the liquid tends to be non-polluting.

A valuable diminishing asset, namely silver, is recovered in this process.

A valuable petro-chemical resource, namely plastic, is able to be recovered for re-use. Since the plastic is a potential pollutant, i.e. a non-bio-degradable product, its recirculation and re-use avoids the further pollution which simple discarding would produce.

It is considered that this process is not limited to single sheets. It is believed that rolls of scrap film can be handled by downcoiling and re-coiling through the steps set out above in a continuous manner, in order to permit immediate re-use. For example, it often happens in the film production industry that large rolls of film are not sold or used before the "cut-off date" marked by the manufacturer (i.e., the date beyond which natural degeneration of either the silver halide crystals or the gelatine base render the film unsuitable for use). In such cases, the rolled film can simply be passed through the tanks described above in a continuous manner (with suitable agitation and possibly with mechanical agitation of the film itself), in order to permit re-coating for re-use. It should be noted that the agitation in the tanks can be by means other than pumps. For example mixers, paddle blades, and other means could be employed. Wetting agents could also be added and pressurized air could possibly be utilized.

While the process of this invention has been described as having the advantage of yielding film consisting only of the plastic base layer, which can then be utilized again to produce film ready for exposure, there are certain instances in which recovery of the plastic film base itself will not be desired. This would be in cases where the recovery of silver is the primary purpose of the process. In such cases, it may be practical to burn the plastic base layer of the film as a fuel, in order to produce heat that can be used to maintain the wash tank temperature in the desired range for the correct activity of the enzymes.

I claim:

1. A method of treating photographic film consisting of a plastic base layer, an overlayer of adhesive, and an organic layer containing silver, to recover silver therefrom, comprising the steps:

passing the film into a wash tank containing hot water at a temperature in the range from about 30° C. to about 60° C. and a pH in the range of about 5 to about 9, the water containing at least one enzyme selected from the enzyme families: protease, amylase, lipase;

allowing the film to remain in the wash tank while agitating the water therein, whereby the enzyme or enzymes attack the adhesive and organic layers and the agitated water can separate them from the plastic base layer, removing the film from the wash tank and passing it into a rinse tank containing one of (a) a weak aqueous glycol solution, or (b) a weak caustic solution;

allowing the film to remain in the rinse tank while agitating the liquid therein, whereby remaining adhesive can be attacked by the liquid and the agitation can further remove remaining portions of adhesive and organic material from the plastic base layer, removing the film from the rinse tank and drying it, and removing liquid from the wash tank and passing it through means for abstracting silver therefrom.

2. The method claimed in claim 1, in which wash tank liquid is removed and put through a centrifuge to separate metallic silver and other solids therefrom.

3. The method claimed in claim 1, in which wash tank liquid is removed and put through a filter to collect silver and other solids on sheets of filter paper, the filter paper thereafter being roasted to burn off gelatin and other non-metallic materials, leaving primarily metallic silver.

4. The method claimed in claim 1, in which make-up provisions are made (a) to replenish water and enzymes to the wash tank, and (b) to replenish liquid to the rinse tank.

5. The method claimed in claim 4, in which the pH of the water in the wash tank is maintained between 6.8 and 7.2.

6. The method claimed in claim 1, in which the pH of the water in the wash tank is maintained within 0.5 of neutral.

7. The method claimed in claim 1, in which the plastic base layer of the film which is recovered after drying is burned to produce heat which is then used to maintain the temperature of the water in the wash tank.

* * * * *